(12) United States Patent
Guo et al.

(10) Patent No.: US 10,969,674 B2
(45) Date of Patent: Apr. 6, 2021

(54) DISPLAY SYSTEM

(71) Applicant: APPOTRONICS CORPORATION LIMITED, Guangdong (CN)

(72) Inventors: Zuqiang Guo, Shenzhen (CN); Fei Hu, Shenzhen (CN); Yi Li, Shenzhen (CN)

(73) Assignee: Appotronics Corporation Limited, Guangdong (CN)

( * ) Notice: Subject to any disclaimer, the term of this patent is extended or adjusted under 35 U.S.C. 154(b) by 2 days.

(21) Appl. No.: 16/500,773

(22) PCT Filed: Nov. 3, 2017

(86) PCT No.: PCT/CN2017/109340
§ 371 (c)(1),
(2) Date: Oct. 3, 2019

(87) PCT Pub. No.: WO2018/184387
PCT Pub. Date: Oct. 11, 2018

(65) Prior Publication Data
US 2020/0089093 A1 Mar. 19, 2020

(30) Foreign Application Priority Data
Apr. 6, 2017 (CN) .......................... 201710221224.9

(51) Int. Cl.
*G03B 21/20* (2006.01)
*H04N 9/31* (2006.01)
(Continued)

(52) U.S. Cl.
CPC .......... *G03B 21/208* (2013.01); *G02B 26/04* (2013.01); *G02B 27/283* (2013.01);
(Continued)

(58) Field of Classification Search
CPC .............. G03B 21/2053; G03B 21/208; G03B 21/2073; G03B 21/006; G03B 21/008;
(Continued)

(56) References Cited

U.S. PATENT DOCUMENTS

2002/0171807 A1* 11/2002 Hibi ..................... H04N 9/3194
352/198
2003/0071973 A1 4/2003 Hansen et al.
(Continued)

FOREIGN PATENT DOCUMENTS

CN 1520193 A 8/2004
CN 1555509 A 12/2004
(Continued)

OTHER PUBLICATIONS

International Search Report of corresponding Patent Application No. PCT/CN2017/109340—5 pages (dated Feb. 1, 2018).
(Continued)

*Primary Examiner* — Ryan D Howard
(74) *Attorney, Agent, or Firm* — Knobbe, Martens, Olson & Bear, LLP

(57) ABSTRACT

A display system includes: a light source, a light modulator, a recovery device, and a light intensity adjustment device. The light source emits original light that is incident to the light modulator. The light modulator modulates, on the basis of image data of an image to be displayed, the light incident thereto so as to form image light and non-image light. The recovery device recovers the non-image light, and the recovered non-image light is incident to the light modulator. The light intensity adjustment device adjusts, on the basis of the intensity of the non-image light corresponding to the currently modulated image to be displayed, the intensity of the original light emitted by the light source, thus allowing total intensity of the original light and the recovered non-image
(Continued)

light that are incident to the light modulator to be kept consistent in modulation periods for different images to be displayed.

16 Claims, 5 Drawing Sheets

(51) Int. Cl.
*G02B 26/04* (2006.01)
*G02B 27/28* (2006.01)

(52) U.S. Cl.
CPC ..... *G03B 21/2053* (2013.01); *G03B 21/2066* (2013.01); *G03B 21/2073* (2013.01); *H04N 9/3126* (2013.01); *H04N 9/3155* (2013.01)

(58) Field of Classification Search
CPC .. H04N 9/3126; H04N 9/3167; H04N 9/3155; H04N 9/3105
See application file for complete search history.

(56) References Cited

U.S. PATENT DOCUMENTS

| | | | |
|---|---|---|---|
| 2013/0162954 A1 | 6/2013 | Huang et al. |
| 2016/0119595 A1 | 4/2016 | Lyubarsky et al. |

FOREIGN PATENT DOCUMENTS

| | | |
|---|---|---|
| CN | 101702072 A | 5/2010 |
| CN | 102279507 A | 12/2011 |
| CN | 105573033 A | 5/2016 |
| CN | 106154731 A | 11/2016 |
| JP | 2003-121922 A | 4/2003 |

OTHER PUBLICATIONS

Extended European Search Report issued in application No. 17904831.9 dated Jul. 16, 2020.

* cited by examiner

DISPLAY SYSTEM

CROSS REFERENCE TO RELATED APPLICATIONS

This is a U.S. National Stage Application, filed under 35 U.S.C. 371, of International Patent Application No. PCT/CN2017/109340, filed on Nov. 3, 2017, which claims priority to Chinese patent application No. 201710221224.9 filed on Apr. 6, 2017, contents of both of which are incorporated herein by reference in their entireties.

TECHNICAL FIELD

The present disclosure relates to the field of display technologies, and in particular, to a display system.

BACKGROUND

In a projection device in the related art, Liquid Crystal Displays (LCD) are generally connected in parallel. Due to such manner of the LCDs, each LCD processes light of at least one color, combines the light to form combined light and emits the combined light. Specifically, as shown in FIG. 1, light emitted by a light source is split by a dichroic mirror 11 and then reaches red, green and blue LCDs 12-14 respectively. The LCDs process the light to form image light, which is combined by an X-Cube 15 and then emitted by a projection lens to be incident to a screen so as to form an image.

In the related art, in order to achieve high brightness display, it is conventional practice to increase a power of a lamp in order to increase total brightness of light emitted by a light source. However, this reduces a life of the lamp and increases a cost, and increase in brightness is also not proportional. Moreover, in the related art, a matching relationship between brightness of an image and its image data cannot be guaranteed.

SUMMARY

The technical problem to be solved by the present disclosure is to provide a display system capable of improving a brightness of an image at a low cost while ensuring that relative brightness of different images matches a relative relationship of image data of the images.

In order to solve the above technical problems, one technical aspect adopted in the present disclosure is to provide a display system, which includes a light source, a light modulator, a recovery device, and a light intensity adjustment device, wherein:

the light source is configured to emit an original light, and the original light is incident to the light modulator;

the light modulator is configured to modulate the light incident thereto according to image data of an image to be displayed, so as to form image light for displaying the image and non-image light not for displaying the image;

the recovery device is configured to recover the non-image light, and the recovered non-image light is to be incident to the light modulator; and the light intensity adjustment device is configured to, according to intensity of the non-image light corresponding to currently modulated image to be displayed, adjust intensity of the original light emitted by the light source in such a manner that during modulation periods of different images to be displayed, total intensity of the original light and the recovered non-image light that are incident to the light modulator is kept consistent.

In order to solve the above technical problems, another technical aspect adopted in the present disclosure is to provide a display system, which includes a light source, a light homogenizing element, a first light modulator, a second light modulator, and a recovery device, wherein:

the light source is configured to emit original light which is incident from an incidence side of the light homogenizing element to the light homogenizing element;

the light homogenizing element is configured to homogenize the light incident from the incidence side thereof, and the homogenized light is emitted to the first light modulator;

the first light modulator modulates the light incident thereto according to image data of an image to be displayed, so as to form first image light for displaying the image and first non-image light not for displaying the image;

the first image light is incident to the second light modulator, the second light modulator modulates the light incident thereto according to the image data of the image to be displayed, so as to form second image light for displaying the image and a second non-image light not for displaying the image; and the recovery device is configured to recover the first non-image light and the second non-image light in such a manner that the first non-image light and the second non-image light are incident from the incidence side of the light homogenizing element to the light homogenizing element and the first non-image light and the second non-image light are homogenized by the light homogenizing element.

Beneficial Effect

The present disclosure has following beneficial effects. The present disclosure provides a display system, and the display system includes a light source, a light modulator, a recovery device, and a light intensity adjustment device, wherein: the light source is configured to emit original light, and the original light is incident to the light modulator; the light modulator is configured to modulate the light incident thereto according to image data of an image to be displayed, so as to form image light for displaying the image and non-image light not for displaying the image; the recovery device is configured to recover the non-image light, and the recovered non-image light is incident to the light modulator; the light intensity adjustment device is configured to, according to intensity of the non-image light corresponding to the currently modulated image to be displayed, adjust intensity of the original light emitted by the light source, in such a manner that during modulation periods of different images to be displayed, total intensity of the original light and the recovered non-image light that are incident to the light modulator is kept consistent. Therefore, since the non-image light is recovered, the present disclosure maintains a lower cost and improves brightness of the image. In addition, the present disclosure also adjusts the intensity of the original light emitted by the light source according to the intensity of the non-image light, in such a manner that during modulation periods of different images to be displayed, total intensity of the original light and the recovered non-image light that are incident to the light modulator is kept consistent. Thus, it is ensured that the relative brightness of the different images matches the relative relationship of the image data of the image.

DESCRIPTION OF EMBODIMENTS

Figure 1:
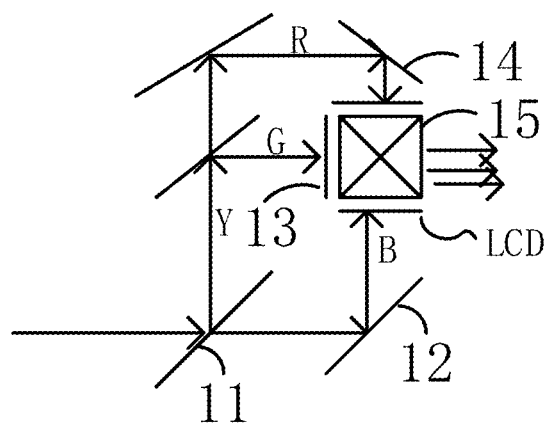
FIG. 1 is a structural schematic diagram of a light source system in the related art.
Figure 2:
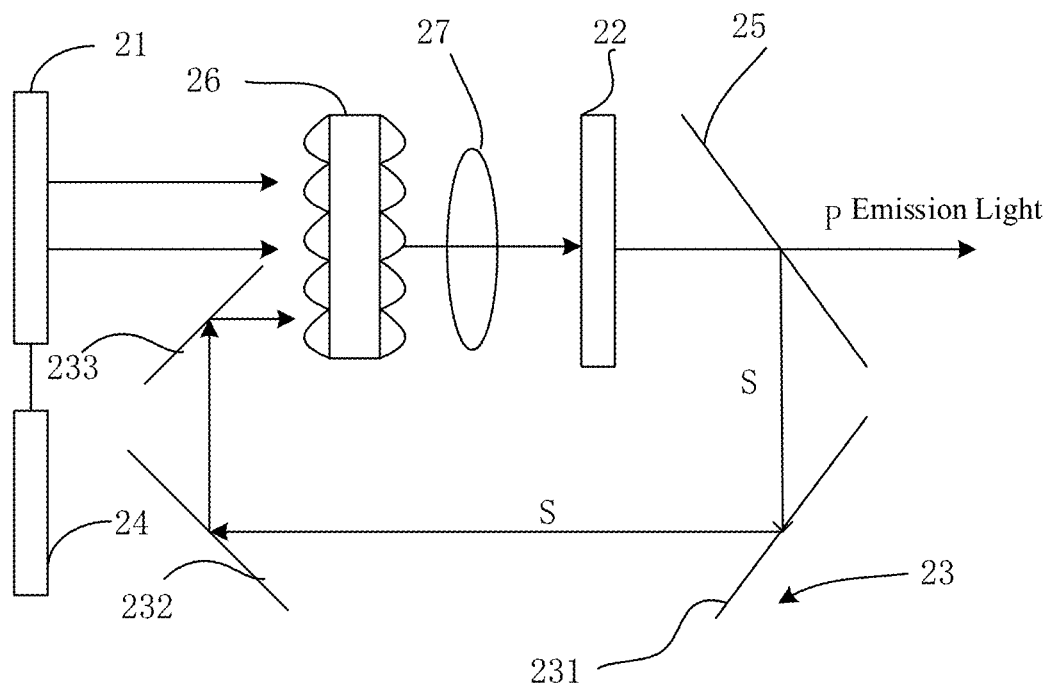
FIG. 2 is a structural schematic diagram of a display system according to an embodiment of the present disclosure.

Referring to FIG. 2, FIG. 2 is a structural schematic diagram of a display system according to an embodiment of the present disclosure. As shown in FIG. 2, the display system 20 of the present disclosure includes a light source 21, a light modulator 22, a recovery device 23, and a light intensity adjustment device 24.

The light source 21 is configured to emit original light, and the original light is incident to the light modulator 22.

The light source 21 can be laser light source, an LED light source, or a fluorescent light source. In this embodiment, the light source 21 is preferably laser light source, and the laser light source emits laser light. Because an etendue of laser light is small, it is not necessary to fill an incidence surface of an entire light homogenizing element (described later in detail) when entering the light homogenizing element, whereas it is possible to leave space for a recovered non-image light to be incident again, making it easier to recover the non-image light.

The light modulator 22 is configured to modulate light incident thereto according to image data of an image to be displayed, so as to form image light P for displaying the image and non-image light S not for displaying the image. Specifically, the original light emitted by the light source 21 is modulated in a time sequence.

The light modulator 22 is an LCD. A light beam thereon is preferably emitted at around F#2.4. Secondly, considering the transmittance, aperture ratio, processing process and cost of the light modulator 22 itself, the light modulator 22 is made as big as possible within an allowable range, so as to increase its efficiency and reduce the cost. Specifically, a size of the light modulator 22 is preferably close to a size of the light homogenizing element. When the display system 20 is a camera system, the size of the light modulator 22 is more than five times the size of a spatial light modulator in an imaging system in a latter optical machine.

The recovery device 23 is configured to recover the non-image light. The recovered non-image light S is incident to the light modulator 22, and the non-image light S is modulated by the light modulator 22.

The light intensity adjustment device 24 is configured to, according to the intensity of the non-image light S corresponding to the currently modulated image to be displayed, adjust intensity of the original light emitted by the light source 20, in such a manner that during modulation periods of different images to be displayed, total intensity of the original light and the recovered non-image light S that are incident to the light modulator is kept consistent.

In this embodiment, the display system 20 further includes a light homogenizing element 26 located on an optical path between the light source 21 and the light modulator 22. The original light is incident from an incidence side of the light homogenizing element 26 to the light homogenizing element 26. The light homogenizing element 26 is configured to homogenize the light incident from the incidence side thereof, and the homogenized light is emitted to the light modulator 22. In this embodiment, the light homogenizing element 26 is preferably a fly-eye lens. In other embodiments, the light homogenizing element 26 may be others. The light entering the fly-eye lens 26 is preferably perpendicular to a direction of the fly-eye lens 26. That is, the original light and the recovered non-image light S are preferably parallel.

The display system 20 further includes a polarization beam splitter 25 configured to divide the image light P and the non-image light S that are formed by modulation of the light modulator 22 to two paths for emission, in such a manner that the image light is emitted to a predetermined emission optical path and the non-image light is emitted along an optical path capable of reaching the recovery device 23. Since the light modulator 22 is an LCD, the light modulated by the LCD has different polarization directions. The polarization beam splitter 25 of the present embodiment achieves a light splitting effect by transmitting light of a specific polarization direction such as the image light P and reflecting light of another polarization direction such as the non-image light S.

The recovery device 23 of the present embodiment includes mirrors 231-233. The mirrors 231-233 cooperate to guide the non-image light S to be reflected back to the incidence side of the light homogenizing element 26 to be incident to the light homogenizing element 26, and the recovered non-image light S is homogenized by the light homogenizing element 26.

The display system 20 also includes a light collecting device 27 disposed between the light homogenizing element 26 and the light modulator 22 and configured to collect the light homogenized by the light homogenizing element 26 so that the light enters the light modulator 22. The light collecting device 27 is in a form of a lens or a lens assembly.

Therefore, in this embodiment, since the non-image light is recovered, the cost is kept relatively low, and the brightness of the image is improved. In addition, the present disclosure also adjusts the intensity of the original light emitted by the light source according to the intensity of the non-image light, so that during modulation periods of different images to be displayed, the total intensity of the original light and the recovered non-image light that are incident to the light modulator is consistent. Therefore, it is ensured that the relative brightness of different images matches the relative relationship of the image data of the image.

Figure 3:
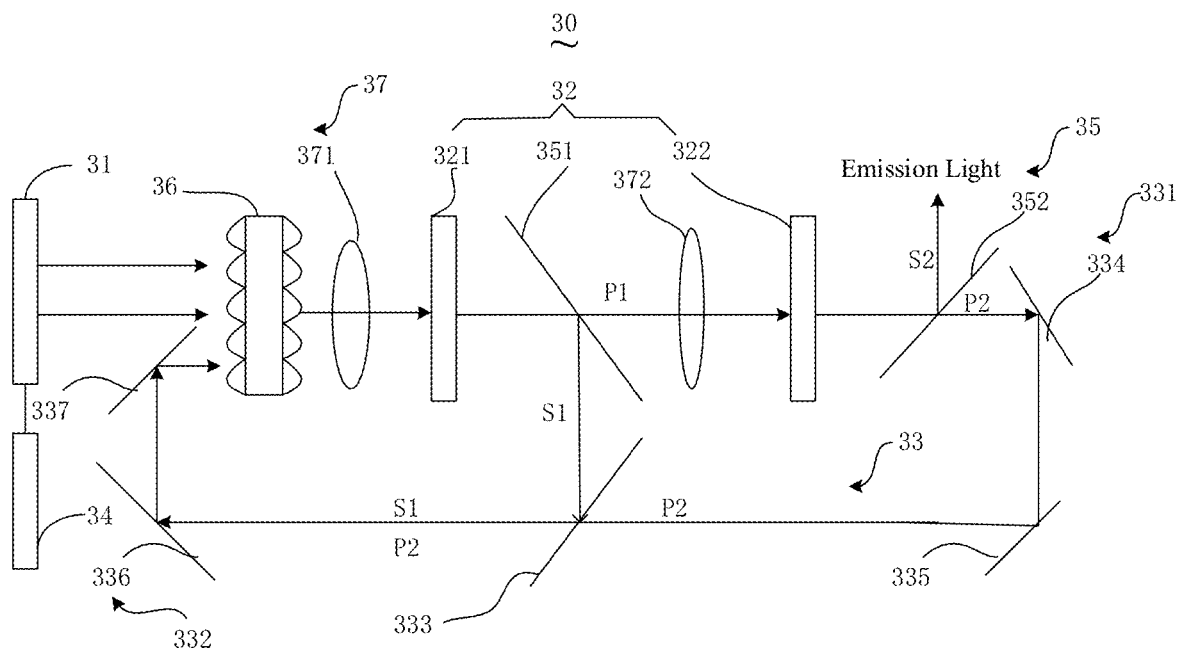
FIG. 3 is a structural schematic diagram of another display system according to an embodiment of the present disclosure.

Referring to FIG. 3, FIG. 3 is a structural schematic diagram of another display system according to an embodiment of the present disclosure. As shown in FIG. 3, the display system 30 of the present embodiment further includes a light source 31, a light homogenizing element 36, a light modulator 32, a recovery device 33, a light intensity adjustment device 34, a polarization beam splitter 35, and a light collecting device 37. Further, functions, shapes and structures of the light source 31, the light homogenizing element 36, the light modulator 32, the recovery device 33, the light intensity adjustment device 34, the polarization beam splitter 35 and the light collecting device 37 are the same as those of the light source 21, the light homogenizing element 26, the light modulator 22, the recovery device 23, the light intensity adjustment device 24, the polarization beam splitter 25 and the light collecting device 27 described above.

One of differences between the display system 30 in the present embodiment and the display system 20 described above lies in that two light modulators 32 of the present embodiment are included, i.e., a first light modulator 321 and a second light modulator 322. Two polarization beam splitters 35 and two light collecting devices 37 are includes, i.e., a first polarization beam splitter 351 and a second polarization beam splitter 352 and a first light collecting device 371 and a second light collecting device 372, respectively.

Specifically, the light source 31 is configured to emit original light, and the original light 31 is incident from the incidence side of the light homogenizing element 36 to the light homogenizing element 36.

The light homogenizing element 36 is configured to homogenize the light incident from the incidence side thereof, and the homogenized light is emitted to the first light modulator 321.

The first light modulator 321 modulates the light incident thereto according to image data of an image to be displayed, so as to form first image light P1 for displaying the image and first non-image light S1 not for displaying the image.

The first image light P1 is incident to the second light modulator 322. The second light modulator 322 modulates the light incident thereto according to the image data of the image to be displayed, so as to form second image light S2 for displaying the image and second non-image light P2 not for displaying the image.

The recovery device 33 is configured to recover the first non-image light S1 and the second non-image light P2, such that the first non-image light S1 and the second non-image light P2 are incident from the incidence side of the light homogenizing element 36 to the light homogenizing element 36, and the first non-image light S1 and the second non-image light P2 are homogenized by the light homogenizing element 36.

The light recovered by the recovery device 33 and the original light are incident to the light homogenizing element 36 in a direction substantially parallel with an optical axis of the light homogenizing element 36. An irradiation region of the original light on the incidence surface of the light homogenizing element 36 is different from an irradiation region of the light recovered by the recovery device 33 on the incidence surface of the light homogenizing element 36. This facilitates uniformly mixing the original light and the recovered light and allowing directions in which the original light and the recovered light after the homogenizing are incident to the first light modulator 321 to be consistent.

The light intensity adjustment device 34 is configured to adjust the intensity of the original light emitted by the light source 31 according to the intensity of the non-image light corresponding to the currently modulated image to be displayed, such that during the modulation periods of the different images to be displayed, the total intensity of the original light and the recovered non-image light that are incident from the incidence side to the light homogenizing element 36 is kept consistent.

For example, in a first frame of image, there is one pixel having a gray value of 100, and there are also another 100 pixels each having a gray value of 1. In a second frame of image, there is one pixel having a gray value of 200, and there are also another 100 pixels each having a gray value of 1. There are two light modulators, 321 and 322 respectively, and the same signal is provided to the two modulators. It is assumed that an illumination light intensity of the light source 31 is a, so that after light recovery and redistribution, in the first frame of image, the emission light of the pixel having the gray value of 100 is a/2, and in the second frame of image, the emission light of the pixel having the gray value of 200 is 2a/3. In this way, it is combined with the following spatial light modulator, so that for the first frame of image, the emission light of the pixel having the gray value of 100 is a/2*100=50a; for the second frame of image, the emission light of the pixel having the gray value of 200 is 2a/3*200=400a/3, and an actual brightness ratio of the these two is 8:3 instead of 2:1. In order to maintain the ratio of 2:1, the light intensity adjustment device 24 adjusts the intensity of the original light, for example, the intensity of the original light emitted by the image source of the second frame can be adjusted to 75% of the original one, and then the ratio becomes 8/3*0.75=2:1. That is, the relative brightness of different images matches the relative relationship of the image data of the image.

The first polarization beam splitter 351 is configured to divide the first image light P1 and the first non-image light S1 that are formed by modulation of the first light modulator 321 to two paths for emission, in such a manner that the first image light P1 is emitted along the optical path capable of reaching the second light modulator 322 and the first non-image light S1 is emitted along the optical path capable of reaching the recovery device 33.

The second polarization beam splitter 352 is configured to divide the second image light S2 and the second non-image light P2 that are formed by modulation of the second light modulator 322 to two paths for emission, in such a manner that the second image light S2 is emitted to the predetermined emission optical path and the second non-image light P2 is emitted along the optical path capable of reaching the recovery device 33.

The polarization directions of the first non-image light S1 and the second non-image light P2 are perpendicular to each other. The recovery device 33 combines the first non-image light S1 and the second non-image light P2 into one light by means of polarization-combining and guides the combined light to the light homogenizing element 36.

Specifically, the recovery device 33 includes a first mirror assembly 331 and a second mirror assembly 332 and a polarization light combiner 333, wherein:

The first mirror assembly 331 is disposed on an optical path of one of the first non-image light S1 and the second non-image light P2 and configured to reflect one of the first non-image light S1 and the second non-image light P2 to the polarization light combiner 333. The polarization light combiner 333 is disposed on the optical path of the other of the first non-image light S1 and the second non-image light P2 and configured to perform polarization-combining on the incoming first non-image light S1 and the second non-image light P2.

As shown in FIG. 3, in the embodiment, the first mirror assembly 331 includes mirrors 334 and 335 disposed on the optical path of the second non-image light P2 and configured to reflect the second non-image light P2 to the polarization light combiner 333. The polarization light combiner 333 is disposed on the optical path of the first non-image light S1 and configured to perform polarization-combining on the incoming first non-image light S1 and the second non-image light P2.

The second mirror assembly 332 is disposed at an emission end of the polarization light combiner 333 and configured to reflect the polarization-combined first non-image light P1 and the second non-image light S2 to the incidence side of the light homogenizing element 36. Specifically, the second mirror assembly 332 includes mirrors 336 and 337 that cooperate to reflect the first non-image light P1 and the second non-image light S2 to the incidence side of the light homogenizing element 36.

The first light collecting device 371 is disposed between the first light modulator 321 and the light homogenizing element 36 and configured to collect the light that has been homogenized by the light homogenizing element 36 in order to emit it to the first light modulator 321. The second light collecting device 372 is disposed between the first polarization beam splitter 351 and the second light modulator 352 and configured to collect the first image light P1 and emit it to the second light modulator 322.

Figure 4:
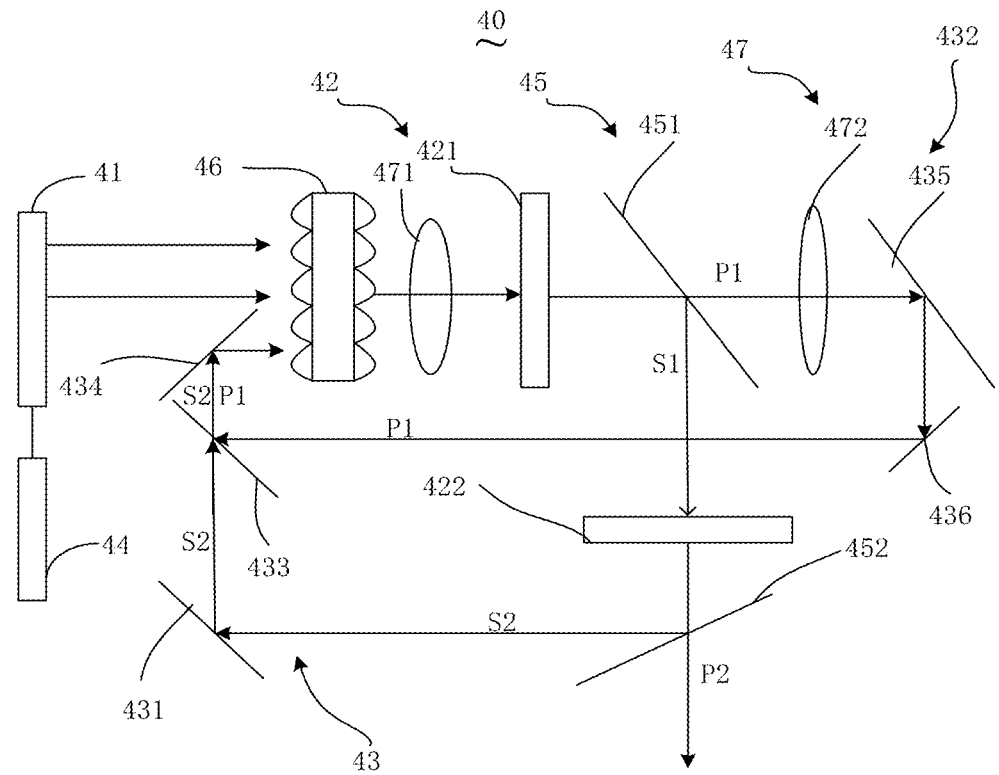
FIG. 4 is a structural schematic diagram of still another display system according to an embodiment of the present disclosure.

Referring to FIG. 4, FIG. 4 is a schematic diagram of still another display system according to an embodiment of the present disclosure. As shown in FIG. 4, the display system 40 of the present embodiment further includes a light source 41, a light homogenizing element 46, a light modulator 42, a recovery device 43, a light intensity adjustment device 44, a polarization beam splitter 45, and a light collecting device 47. Further, functions, shapes and structures of the light source 41, the light homogenizing element 46, the light modulator 42, the recovery device 43, the light intensity adjustment device 44, the polarization beam splitter 45, and the light collecting device 47 are the same as those of the light source 31, the light homogenizing element 36, the light modulator 32, the recovery device 33, the light intensity adjustment device 34, the polarization beam splitter 35 and the light collecting device 37 described above.

The display system 40 in this embodiment differs from the display system 30 described above in that the recovery device 43 of the present embodiment includes a polarization light combiner 433, a first mirror assembly 431, a second mirror assembly 432 and a third mirror assembly 434.

The first mirror assembly 431 is disposed on the optical path of the second non-image light S2 and configured to reflect the second non-image light S2 to the polarization light combiner 433. The first mirror assembly 431 includes only one mirror.

The second mirror assembly 432 is disposed on the optical path of the first non-image light P1 and configured to reflect the first non-image light P1 to the polarization light combiner 433. The second mirror assembly 432 includes mirrors 435 and 436 that cooperate to reflect the first non-image light P1 to the polarization light combiner 433.

The polarization light combiner 433 is configured to perform polarization-combining on the incoming first non-image light P1 and the second non-image light S2.

The third mirror assembly 434 is disposed at an emission end of the polarization light combiner 433 and configured to reflect the polarization-combined first non-image light P1 and the second non-image light S2 to the incidence side of the light homogenizing element 46. The third mirror assembly 434 includes only one mirror.

In addition, the second light collecting device 472 of this embodiment is specifically disposed between the first polarization beam splitter 451 and the mirror 435 and configured to collect the first non-image light P1 and emit it to the mirror 435.

The display system 40 of the embodiment is more compact in structure.

Figure 5:
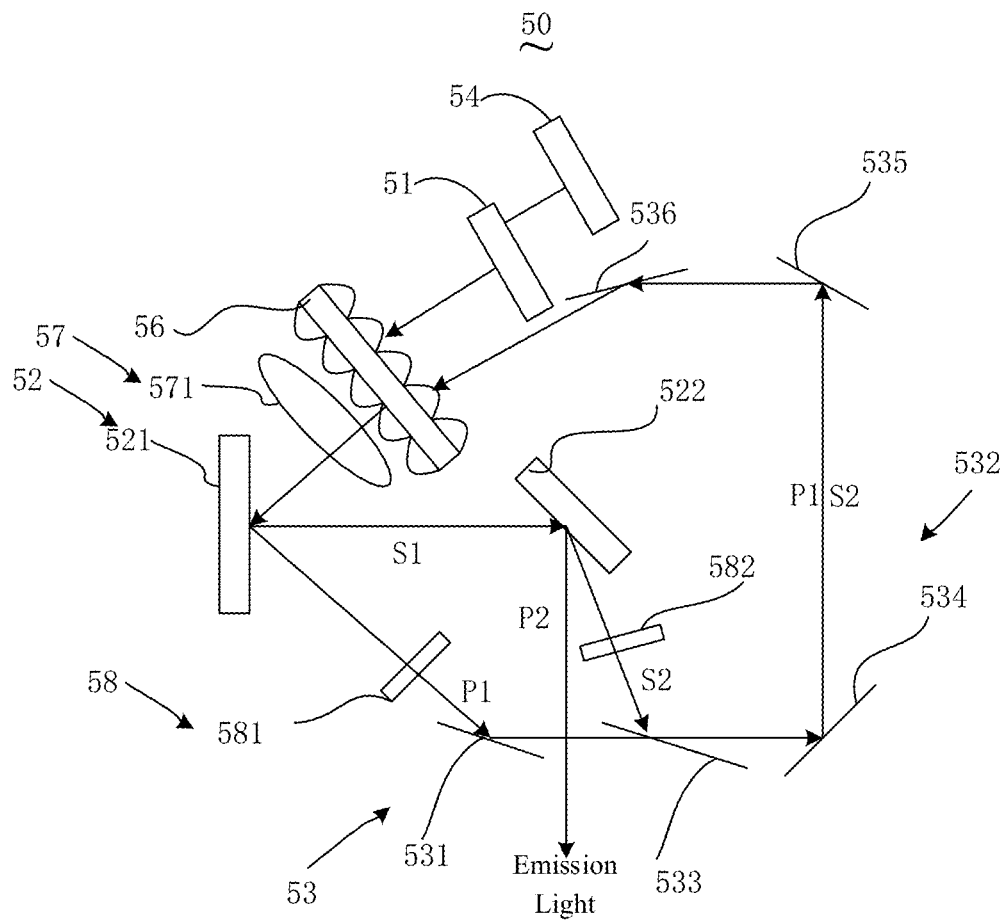
FIG. 5 is a structural schematic diagram of still another display system according to an embodiment of the present disclosure.

Referring to FIG. 5, FIG. 5 is a structural schematic diagram of still another display system according to an embodiment of the present disclosure. As shown in FIG. 5, the display system 50 of the present embodiment further includes a light source 51, a light homogenizing element 56, a light modulator 52, a recovery device 53, a light intensity adjustment device 54, and a light collecting device 57. Further, functions, shapes and structures of the light source 51, the light homogenizing element 56, the light modulator 52, the recovery device 53, and the light intensity adjustment device 54 are the same as those of the light source 41, the light homogenizing element 46, the light modulator 42, and the recovery device 43 and the light intensity adjustment devices 44 described above.

The display system 50 of the present embodiment is different from the display system 30 described above in that the first light modulator 521 and the second light modulator 522 of the display system 50 of the present embodiment are DMD (Digital Micromirror Device).

Moreover, the display system 50 of the present embodiment further includes a first polarizer 581 and a second polarizer 582. The first polarizer 581 polarizes the first non-image light P1 obtained by modulation of the first light modulator 521 in such a manner that the first non-image light P1 has a first polarization direction. The second polarizer 582 polarizes the second non-image light S2 obtained by modulation of the second light modulator 522 in such a manner that the second non-image light S2 has a second polarization direction perpendicular to the first polarization direction.

In the present embodiment, the first mirror assembly 531 of the light recovery device 531 is disposed on the optical path of the first non-image light P1 and configured to reflect the first non-image light P1 to the polarization light combiner 533. The polarization light combiner 533 is disposed on the optical path of the second non-image light S2 and configured to perform polarization-combining on the incoming first non-image light P1 and the second non-image light S2.

The second mirror assembly 532 is disposed at the emission end of the polarization light combiner 533 and configured to reflect the polarization-combined first non-image light P1 and the second non-image light S2 to the incidence side of the light homogenizing element 56. Specifically, the second mirror assembly 532 includes mirrors 534-536 that cooperate to reflect the first non-image light P1 and the second non-image light S2 to the incidence side of the light homogenizing element 56.

Further, the light collecting device 57 of the present embodiment includes only the light collecting device 571 disposed between the light homogenizing element 56 and the first light modulator 521.

In other embodiments, one polarizer may further be disposed between the light source 51 and the light homogenizing element 56 and configured to polarize the original light emitted by the light source 51 to a polarized light.

Figure 6:
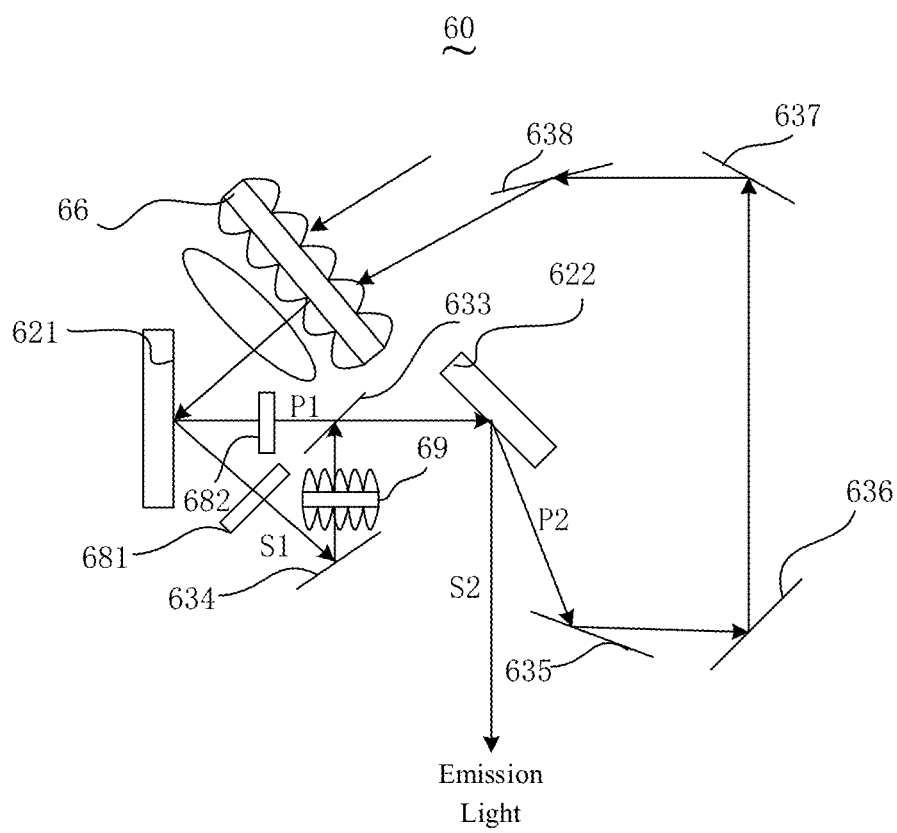
FIG. 6 is a structural schematic diagram of still another display system according to an embodiment of the present disclosure.

Referring to FIG. 6, FIG. 6 is a structural schematic diagram of still another display system according to an embodiment of the present disclosure. As shown in FIG. 6, the display system 60 of the present embodiment differs from the above-described display system 50 in that a first polarizer 681 and a second polarizer 682 of the present embodiment are disposed between the first light modulator 621 and the second light modulator 622. Specifically, the first polarizer 681 and the second polarizer 682 respectively polarize the first image light P1 and the first non-image light S1 that are obtained by modulation of the first light modulator 621, such that they respectively have a first polarization direction and a second polarization direction which are perpendicular to each other.

Further, the light source system 60 of the present embodiment further includes a light homogenizing element 69 disposed between the first polarizer 681 and the second light modulator 622. Therefore, the first image light P1 has a certain light distribution and enters the second light modulator 622, so that the first image light P1 obtained by modulation of the first light modulator 621 is modulated again, thereby improving the contrast. The first non-image light enters the light homogenizing element 69 to be homogenized and then enters the second light modulator 622, thereby increasing the brightness. Moreover, a mirror 634 is disposed between the first polarizer 681 and the light homogenizing element and configured to reflect the first non-image light S1, which has been polarized by the first polarizer 681, to the light homogenizing element 69. A polarization light combiner 633 is disposed between the light homogenizing element 69 and the second light modulator 622, and configured to combine the light polarized by the first polarizer 681 and the second polarizer 682 such that the combined light enters the second light modulator 622. Further, the second non-image light P2 modulated by the second light modulator 622 is reflected and recovered by the mirrors 635-638 to the light homogenizing element 66, thereby improving the brightness.

Figure 7:
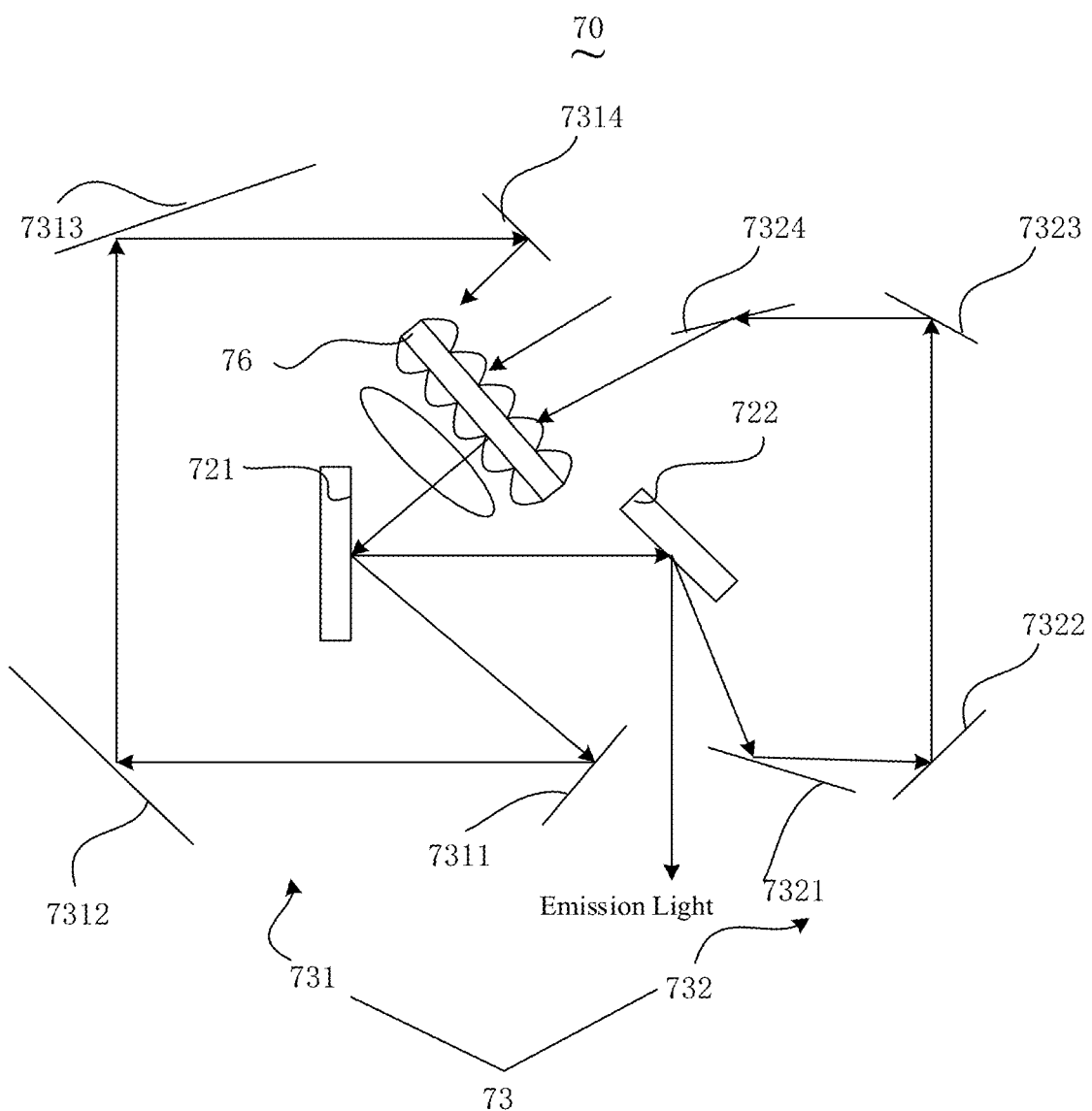
FIG. 7 is a structural schematic diagram of still another display system according to an embodiment of the present disclosure.

Referring to FIG. 7. FIG. 7 is a structural schematic diagram of still another display system according to an embodiment of the present disclosure. As shown in FIG. 7, the display system 70 of the present embodiment differs from the above-described display system 50 in that the display system 70 of the present embodiment respectively recovers the first non-image light and the second non-image light, which are modulated by the first light modulator 721 and the second light modulator 722, to the light homogenizing element 66. Specifically, the recovery device 73 of the display system 70 of the present embodiment includes a first mirror assembly 731 and a second mirror assembly 732.

The first mirror assembly 731 is configured to guide the first non-image light to be reflected to an incidence side of the light homogenizing element 76. Specifically, mirrors 7311-7314 are included, and the mirrors 7311-7314 cooperate to reflect the first non-image light to the incidence side of the light homogenizing element 76.

The second mirror assembly 732 is configured to guide the second non-image light to be reflected to the incidence side of the light homogenizing element 76. Specifically, mirrors 7321-7324 are included, and the mirrors 7321-7324 cooperate to reflect the second non-image light to the incidence side of the light homogenizing element 76.

In summary, the present disclosure improves the contrast of the image and the brightness of the light. Further, by adjusting the intensity of the original light emitted by the light source, the relative brightness of the different images matches the relative relationship of the image data of the image.

The above is only embodiments of the present disclosure and is not intended to limit the scope of the disclosure. All the equivalent structure or equivalent process transformation made according to the specification and the drawings of the present disclosure or those directly or indirectly applied to other related technical field are equally included in the patent scope of the present disclosure.

What is claimed is:

1. A display system, comprising a light source, a light modulator, a recovery device, and a light intensity adjustment device, wherein:
    the light source is configured to emit original light which is incident to the light modulator;
    the light modulator is configured to modulate the light incident thereto according to image data of an image to be displayed, so as to form image light for displaying the image and non-image light not for displaying the image;
    the recovery device is configured to recover the non-image light, wherein the recovered non-image light is to be incident to the light modulator; and
    the light intensity adjustment device is configured to, according to intensity of the non-image light corresponding to currently modulated image to be displayed, adjust intensity of the original light emitted by the light source in such a manner that during modulation periods of different images to be displayed, total intensity of the original light and the recovered non-image light that are incident to the light modulator is kept consistent.

2. The display system according to claim 1, further comprising:
    a light homogenizing element located on an optical path between the light source and the light modulator, wherein the original light is incident from an incidence side of the light homogenizing element to the light homogenizing element, the light homogenizing element is configured to homogenize the light incident from the incidence side thereof, and the homogenized light is emitted to the light modulator, wherein the recovery device guides the recovered non-image light to be incident from the incidence side of the light homogenizing element to the light homogenizing element, and the recovered non-image light is homogenized by the light homogenizing element.

3. The display system according to claim 1, wherein the light source is a laser light source, and the laser light source emits laser light.

4. The display system according to claim 1, wherein the light modulator modulates, in a time-sequence, the original light emitted from the light source.

5. A display system, comprising a light source, a light homogenizing element, a first light modulator, a second light modulator, and a recovery device, wherein:
    the light source is configured to emit original light which is incident from an incidence side of the light homogenizing element to the light homogenizing element;
    the light homogenizing element is configured to homogenize the light incident from the incidence side thereof, and the homogenized light is emitted to the first light modulator;
    the first light modulator modulates the light incident thereto according to image data of an image to be displayed, so as to form first image light for displaying the image and first non-image light not for displaying the image;
    the first image light is incident to the second light modulator, the second light modulator modulates the light incident thereto according to the image data of the image to be displayed, so as to form second image light for displaying the image and second non-image light not for displaying the image; and
    the recovery device is configured to recover the first non-image light and the second non-image light in such a manner that the first non-image light and the second non-image light are incident from the incidence side of the light homogenizing element to the light homogenizing element, and the first non-image light and the second non-image light are homogenized by the light homogenizing element.

6. The display system according to claim 5, wherein the light recovered by the recovery device and the original light are incident to the light homogenizing element in a direction substantially parallel with an optical axis of the light homogenizing element, and an irradiation region of the original light on an incidence surface of the light homogenizing element is different from an irradiation region of the light recovered by the recovery device on the incidence surface of the light homogenizing element.

7. The display system according to claim 5, further comprising:
   a first polarization beam splitter configured to divide the first image light and the first non-image light formed by modulation of the first light modulator into two paths for emission, in such a manner that the first image light is emitted along an optical path capable of reaching the second light modulator and the first non-image light is emitted along an optical path capable of reaching the recovery device; and
   a second polarization beam splitter configured to divide the second image light and the second non-image light formed by modulation of the second light modulator into two paths for emission, in such a manner that the second image light is emitted to a predetermined emission optical path and the second non-image light is emitted along an optical path capable of reaching the recovery device.

8. The display system according to claim 5, wherein polarization directions of the first non-image light and the second non-image light are perpendicular to each other, the recovery device combines the first non-image light and the second non-image light into one light beam by means of polarization-combining and guides the combined light to the light homogenizing element.

9. The display system according to claim 8, wherein the recovery device comprises a first mirror assembly, a second mirror assembly, and a polarization light combiner, wherein:
   the first mirror assembly is disposed on an optical path of one of the first non-image light and the second non-image light and configured to reflect the one of the first non-image light and the second non-image light to the polarization light combiner;
   the polarization light combiner is disposed on an optical path of the other of the first non-image light and the second non-image light and configured to polarization-combine the incoming first non-image light and second non-image light; and
   the second mirror assembly is disposed at an emission end of the polarization light combiner and configured to reflect the polarization-combined first non-image light and second non-image light to the incidence side of the light homogenizing element.

10. The display system according to claim 9, wherein the display system further comprises a first polarizer and a second polarizer, wherein:
   the first polarizer is configured to polarize the first non-image light to obtain the first non-image light having a first polarization direction; and
   the second polarizer is configured to polarize the second non-image light to obtain the second non-image light having a second polarization direction;
   wherein the first polarization direction and the second polarization direction are perpendicular to each other.

11. The display system according to claim 8, wherein the recovery device comprises a polarization light combiner, a first mirror assembly, a second mirror assembly and a third mirror assembly, wherein:
   the first mirror assembly is disposed on an optical path of the second non-image light and configured to reflect the second non-image light to the polarization light combiner;
   the second mirror assembly is disposed on an optical path of the first non-image light and configured to reflect the first non-image light to the polarization light combiner;
   the polarization light combiner is configured to polarization-combine incoming first non-image light and second non-image light; and
   the third mirror assembly is disposed at an emission end of the polarization light combiner and configured to reflect the polarization-combined first non-image light and second non-image light to the incidence side of the light homogenizing element.

12. The display system according to claim 5, wherein the recovery device comprises a first mirror assembly and a second mirror assembly, wherein:
   the first mirror assembly is configured to guide the first non-image light to be reflected to the incidence side of the light homogenizing element; and
   the second mirror assembly is configured to guide the second non-image light to be reflected to the incidence side of the light homogenizing element.

13. The display system according to claim 5, further comprising:
   a light intensity adjustment device configured to, according to intensity of the non-image light corresponding to the currently modulated image to be displayed, adjust intensity of the original light emitted by the light source, such that during modulation periods of different images to be displayed, total intensity of the original light and the recovered non-image light that are incident from the incidence side to the light homogenizing element is kept consistent.

14. A display system, comprising a light source, a first light homogenizing element, a first light modulator, a second light modulator, and a recovery device, wherein:
   the light source is configured to emit original light which is incident from an incidence side of the first light homogenizing element to the first light homogenizing element;
   the first light homogenizing element is configured to homogenize the light incident from the incidence side thereof, and the homogenized light is emitted to the first light modulator;
   the first light modulator modulates the light incident thereto according to image data of an image to be displayed, so as to form first image light for displaying the image and first non-image light not for displaying the image;
   the first image light and the first non-image light are emitted to the second light modulator respectively via different optical paths, the second light modulator modulates the light incident thereto according to the image data of the image to be displayed, so as to form second image light for displaying the image and second non-image light not for displaying the image; and
   the recovery device is configured to recover the second non-image light in such a manner that the second non-image light is incident from the incidence side of the first light homogenizing element to the first light homogenizing element, and the second non-image light is homogenized by the first light homogenizing element.

15. The display system according to claim 14, wherein the display system further comprises a first polarizer, a second polarizer and a polarization light combiner, wherein:
- the first polarizer is configured to polarize the first image light to obtain the first image light having a first polarization direction;
- the second polarizer is configured to polarize the first non-image light to obtain the first non-image light having a second polarization direction, wherein the first polarization direction and the second polarization direction are perpendicular to each other; and
- the polarization light combiner is configured to polarization-combine the first image light having the first polarization direction and the first non-image light having the second polarization direction, wherein the polarization-combined light is incident to the second light modulator.

16. The display system according to claim 15, wherein the display system further comprises a second light homogenizing element, wherein:
- the second light homogenizing element is disposed between the second polarizer and the polarization light combiner, and is configured to homogenize the first non-image light having the second polarization direction, wherein the homogenized light is emitted to the polarization light combiner; and
- the polarization light combiner is further configured to polarization-combine the first image light having the first polarization direction and the homogenized first non-image light having the second polarization direction, wherein the polarization-combined light is emitted to the second light modulator.

* * * * *